United States Patent
Claussen et al.

(10) Patent No.: US 7,567,971 B2
(45) Date of Patent: Jul. 28, 2009

(54) GENERIC SYMBOL REFERENCING MECHANISM

(75) Inventors: Christopher Shane Claussen, Austin, TX (US); Yang Zhong, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 973 days.

(21) Appl. No.: 11/134,481

(22) Filed: May 20, 2005

(65) Prior Publication Data

US 2006/0265407 A1    Nov. 23, 2006

(51) Int. Cl.
*G06F 7/00* (2006.01)
*G06F 17/30* (2006.01)
*G06F 17/00* (2006.01)
(52) U.S. Cl. .......................... 707/100; 717/162; 707/6
(58) Field of Classification Search .................. 707/6, 707/100; 717/162
See application file for complete search history.

(56) References Cited

U.S. PATENT DOCUMENTS

| | | | | |
|---|---|---|---|---|
| 2003/0110264 | A1* | 6/2003 | Whidby et al. | 709/227 |
| 2003/0145281 | A1* | 7/2003 | Thames et al. | 715/513 |
| 2003/0145310 | A1* | 7/2003 | Thames et al. | 717/123 |

* cited by examiner

*Primary Examiner*—Hosain T Alam
*Assistant Examiner*—Van H Ngo
(74) *Attorney, Agent, or Firm*—Yee & Associates, P.C.; Prentiss W. Johnson

(57) ABSTRACT

A method in a data processing system for a generic symbol referencing mechanism. A reference to a symbol is received for resolution. The symbol is identified using a data structure. The data structure comprises a set of symbol space instances, each symbol space instance contains a set of name space registry instances, each name space registry instance contains a set of name space instances, each name space instance contains a set of name instances, each name instance corresponds to a referencable symbol instance, and the referencable symbol instance corresponds to the symbol.

17 Claims, 5 Drawing Sheets

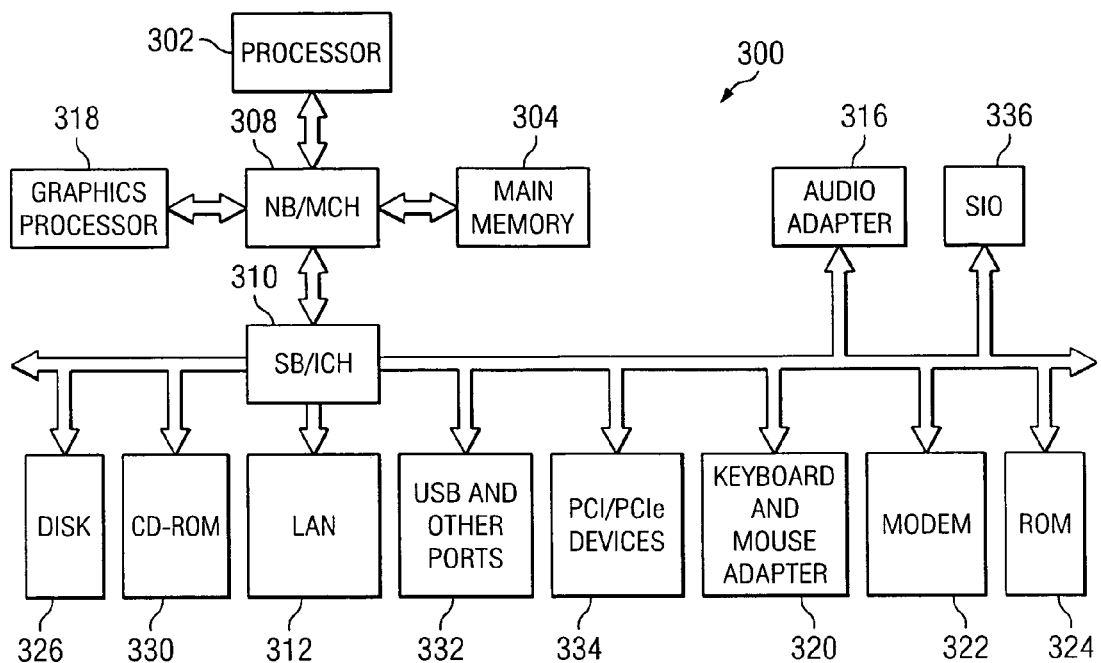
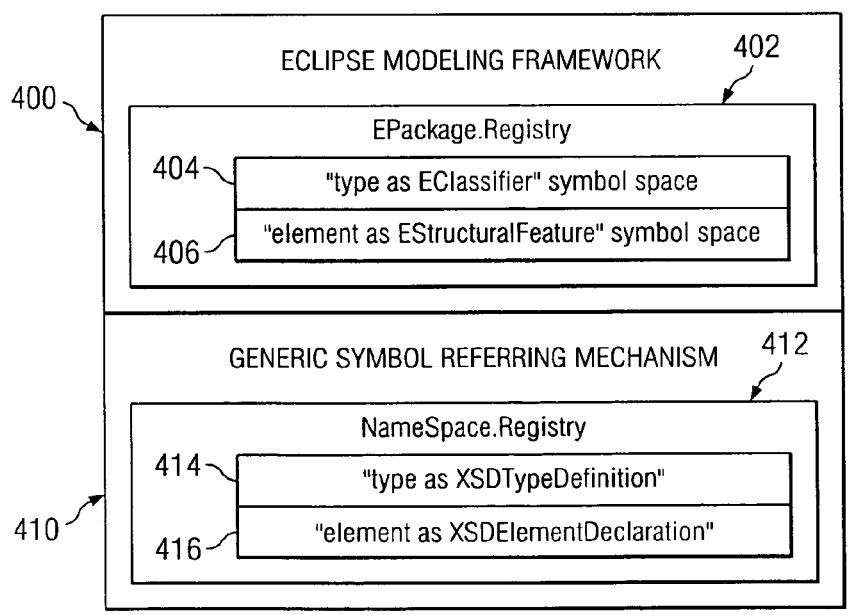

FIG. 6

```
final Scoping scoping=scoping();
  for(Object scope=scoping.getContextScope();; scope=scoping.getParentScope(scope))
  {
    final NameSpace.Registry registryNameSpace=get(scope, false);
    if(null !=registryNameSpace)
    {
      final Object object=iteration.iterate(registryNameSpace,argument);
      if(null !=object)
        return object;
    }
    if(null==scope)
      break;
  }
  return null;
```

FIG. 7

```
public Object getContextScope()
  {
  return Thread.currentThread().getContextClassLoader();
  }
public Object getParentScope (Object scope)
  {
  return ((ClassLoader)scope).getParent();;
  }
```

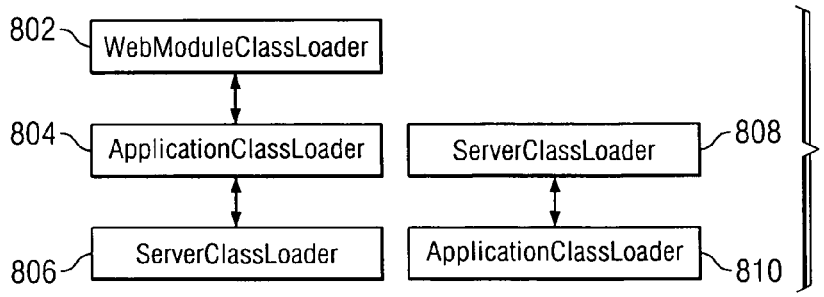

FIG. 8

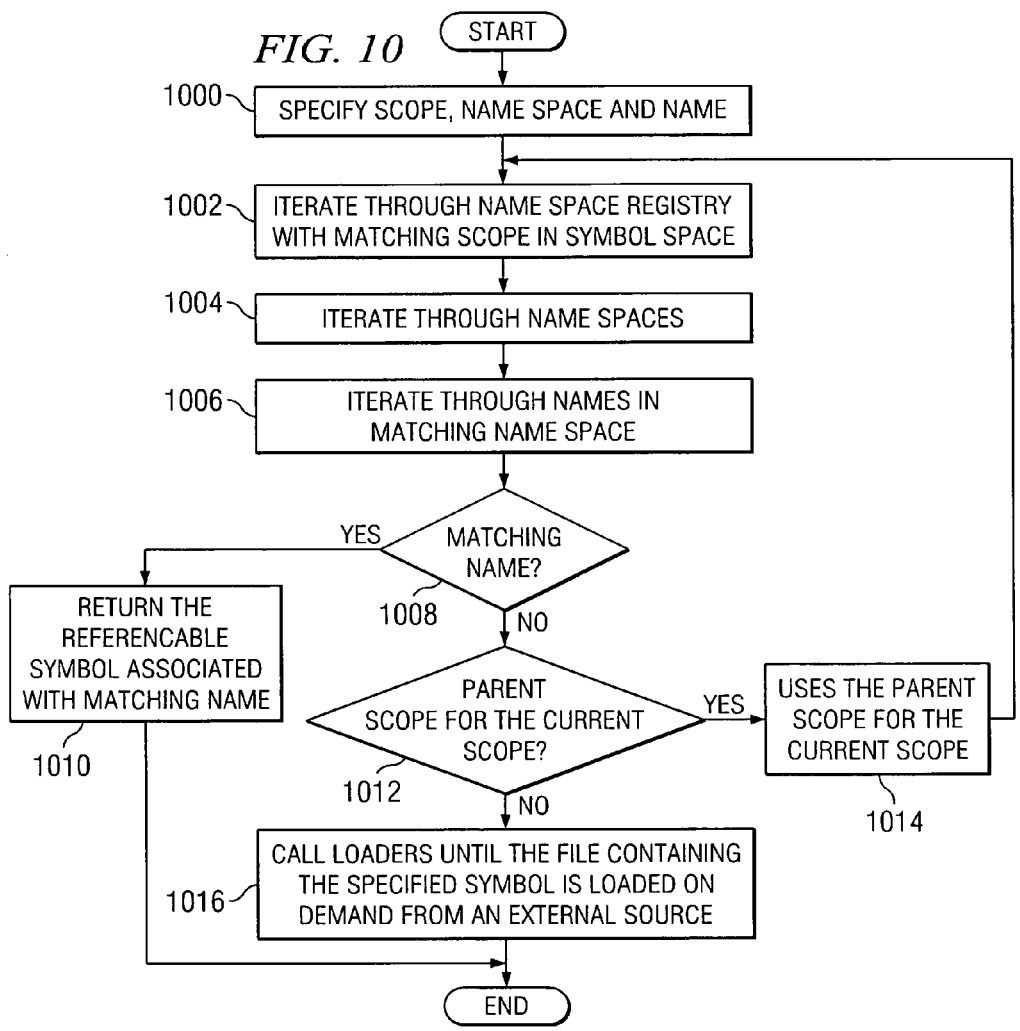

GENERIC SYMBOL REFERENCING MECHANISM

BACKGROUND OF THE INVENTION

1. Technical Field

The present invention relates generally to an improved data processing system and, in particular, to a method, system and computer program product for optimizing performance in a data processing system. Still more particularly, the present invention provides a method, system, and computer program product for a generic symbol referencing mechanism.

2. Description of Related Art

Application development generally starts with consideration of the design model, and then moves to more user interface oriented tasks. Application development frameworks, such as the Eclipse Modeling Framework (EMF), are designed to ease the design and implementation of a structured model. Eclipse Modeling Framework is part of the Model Driven Architecture (MDA). The idea behind Model Driven Architecture is to be able to develop and manage the whole application life cycle by putting the focus on the model. The model itself is described as a meta-model. Then, by using mappings, the model is used to generate software artifacts, which will implement the real system. Eclipse Modeling Framework can be used to build and describe a model for which Java code can be generated and enhanced by higher level Java code. This implemented model can be used as the basis for any Java application development.

However, because Eclipse Modeling Framework is still under development, at the moment Eclipse Modeling Framework implements only a subset of the Model Driven Architecture approach. As such, it does not contain all the mappings needed to make and deploy an application at a wider level, where Extensible Markup Language (XML), Enterprise Application Integration (EAI), Enterprise Java Beans (EJBs), Web Services, and other technologies need to be combined. One challenge faced in using Eclipse Modeling Framework is that no complete solution is present for resolving references to symbols.

A symbol is a representational token for a concept or quantity. In this context, a symbol is a character or set of characters that represent part of a model that is used to generate software artifacts using specific technologies such as Extensible Markup Language, Enterprise Application Integration, Enterprise Java Beans, and Web Services. Resolving a symbol means converting a symbol in a Java application model into executable Java code or Java code that can be enhanced by higher level Java code.

In order to develop application models that can be generated to produce applications that incorporate XML, EAI, EJBs, Web Services, and other technologies, a Model Driven Architecture must be able to resolve references to symbols used by these technologies. A Model Driven Architecture uses mappings from symbols used by these and other technologies to generate Java code that implements these technologies. Any Model Driven Architecture that cannot resolve symbols used by these technologies cannot directly generate the Java code necessary to implement models developed that use these technologies.

With respect to resolving references to symbols, Eclipse Modeling Framework can only resolve two categories of references to symbols, type and element, and only supports one format for type. Type and element are two specific categories of references to symbols that are supported by Eclipse Modeling Framework. Within these categories, each type and element has a specific name, and each specific name is associated with a specific referencable symbol. Each name is a specific identifier for a symbol, and each referencable symbol is a specific definition for the symbol, a definition that can be used to generate of Java code for the symbol. By using a specific name to reference a specific referencable symbol, Eclipse Modeling Framework can generate the Java code necessary to implement a model that uses the supported type or element.

A registry is a database used to store configuration information, and Eclipse Modeling Framework uses a registry named EPackage.Registry to directly resolve types (such as EClassifier), and to indirectly resolve elements (such as EStructuralFeature). Because type resolving is done directly and element resolving is done indirectly, resolving is not done consistently. EPackage.Registry is not generic, and therefore it cannot resolve type or element as other models other than EClassifier or EStructuralFeature, nor can it resolve other symbols. In addition, EPackage.Registry does not support symbol loading on demand, whereby a registry loads a symbol that was not located when referenced.

Furthermore, EPackage.Registry's scoping of symbols is limited to class loaders, such as global and local. The scope of a symbol is the region of a program source within which the symbol represents a certain thing. This region usually extends from the place where it is declared to the end of the smallest enclosing block, such as a begin/end or procedure/function body. An inner block may contain a redeclaration of the same symbol in which case the scope of the outer declaration does not include (is "shadowed" or "occluded" by) the scope of the inner block. As can be seen, EPackage.Registry's limited scoping of symbols is restrictive for any symbol whose scope extends beyond global and local.

Therefore, it would be advantageous to have a method, system, and computer usable code for resolving references to symbols through a generic symbol referencing mechanism.

SUMMARY OF THE INVENTION

The embodiments of the present invention are a method, system, and computer useable code in a data processing system for generic symbol referencing mechanism. A reference to a symbol is received for resolution. The symbol is identified using a data structure. The data structure comprises a set of symbol space instances, each symbol space instance contains a set of name space registry instances, each name space registry instance contains a set of name space instances, each name space instance contains a set of name instances, each name instance corresponds to a referencable symbol instance, and the referencable symbol instance corresponds to the symbol.

BRIEF DESCRIPTION OF THE DRAWINGS

The novel features believed characteristic of the invention are set forth in the appended claims. The invention itself, however, as well as an illustrative mode of use, further objectives and advantages thereof, will best be understood by reference to the following detailed description of an illustrative embodiment when read in conjunction with the accompanying drawings, wherein:

FIG. 3 is a block diagram illustrating a data processing system in which the present invention may be implemented, according to an illustrative embodiment of the present invention;

FIG. 4 illustrates an example of how Eclipse Modeling Framework fits into an embodiment of the present invention, in accordance with an illustrative embodiment of the present invention;

FIG. 6 illustrates a names registry iteration algorithm in accordance with an illustrative embodiment of the present invention;

FIG. 7 illustrates a scoping algorithm in accordance with an illustrative embodiment of the present invention;

FIG. 8 illustrates applications for a scoping algorithm in accordance with an illustrative embodiment of the present invention;

FIG. 9 illustrates iteration algorithms in accordance with an illustrative embodiment of the present invention; and FIG. 10 illustrates a flowchart of a process for resolving references to symbols in accordance with an illustrative embodiment of the present invention.

DETAILED DESCRIPTION OF THE PREFERRED EMBODIMENT

Figure 1:
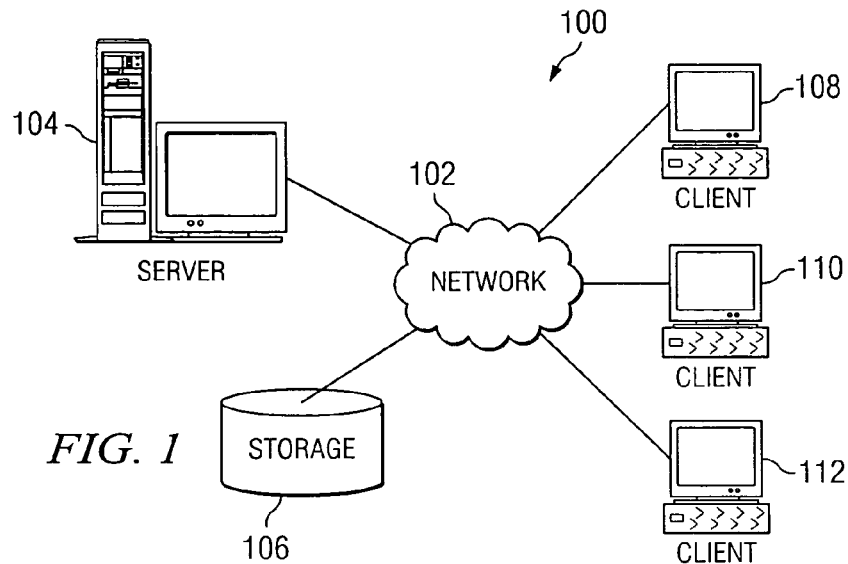
FIG. 1 is a pictorial representation of a data processing system in which the present invention may be implemented, according to an illustrative embodiment of the present invention.
Figure 2:
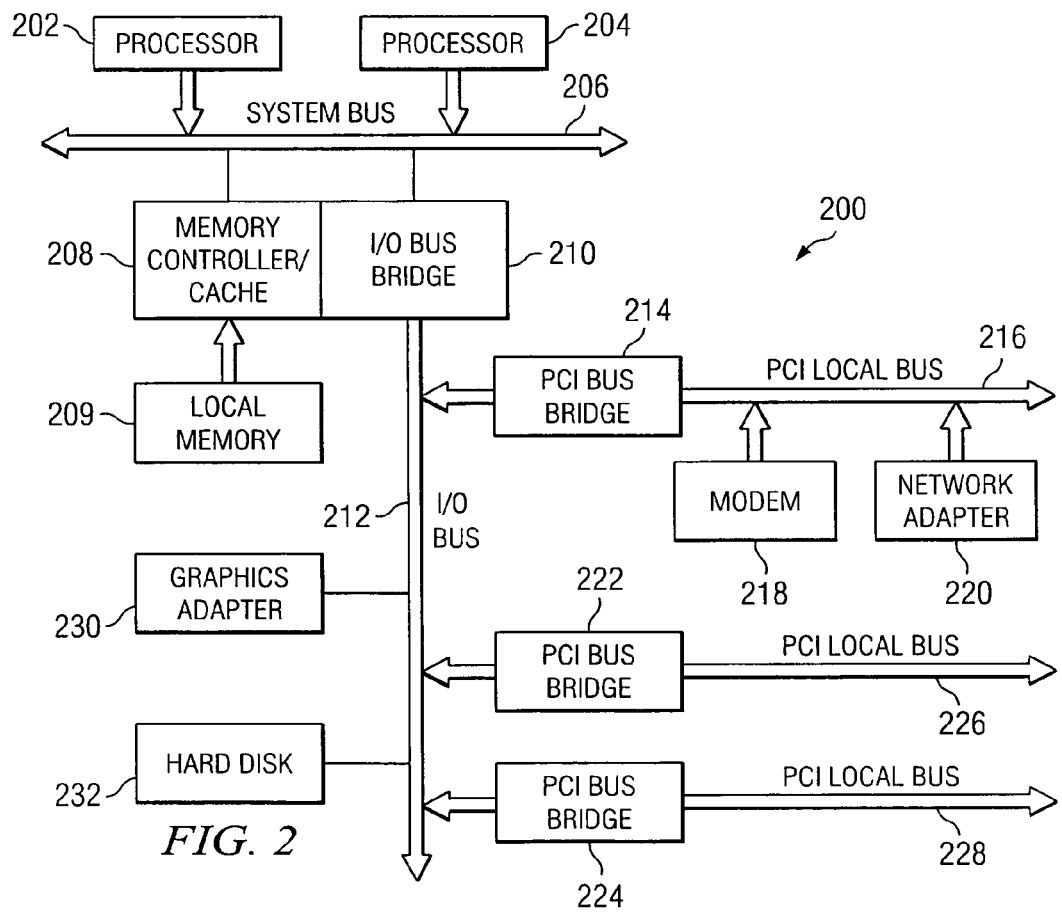
FIG. 2 is a block diagram of a data processing system that may be implemented as a server in which the present invention may be implemented, according to an illustrative embodiment of the present invention.

FIGS. 1-3 are provided as exemplary diagrams of data processing environments in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 connects to network 102 along with storage unit 106. In addition, clients 108, 110, and 112 connect to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

Referring to FIG. 2, a block diagram of a data processing system that may be implemented as a server, such as server 104 in FIG. 1, is depicted in accordance with an illustrative embodiment of the present invention. Data processing system 200 may be a symmetric multiprocessor (SMP) system including a plurality of processors 202 and 204 that connect to system bus 206. Alternatively, a single processor system may be employed. Also connected to system bus 206 is memory controller/cache 208, which provides an interface to local memory 209. I/O bus bridge 210 connects to system bus 206 and provides an interface to I/O bus 212. Memory controller/cache 208 and I/O bus bridge 210 may be integrated as depicted.

Peripheral component interconnect (PCI) bus bridge 214 connects to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eserver™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both).

With reference now to FIG. 3, a block diagram of a data processing system is shown in which aspects of the present invention may be implemented. Data processing system 300 is an example of a computer, such as client 108 in FIG. 1, in which code or instructions implementing the processes for embodiments of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM drive 330, universal serial bus (USB) ports and other communications ports 332, and PCI/PCIe devices 334 connect to ICH 310. PCI/PCIe devices may include, for example, Ethernet adapters, add-in cards, PC cards for notebook computers, etc. PCI uses a card bus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and coordinates and provides control of various components within data processing system 300 in FIG. 3. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 300 (Java is a trademark of Sun Microsystems, Inc. in the United States, other countries, or both).

Instructions for the operating system, the object-oriented programming system, and applications or programs are located on storage devices, such as hard disk drive 326, and may be loaded into main memory 304 for execution by processor 302. The processes for embodiments of the present invention are performed by processor 302 using computer implemented instructions, which may be located in a memory such as, for example, main memory 304, memory 324, or in one or more peripheral devices 326 and 330. These processes may be executed by any processing unit, which may contain one or more processors.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the present invention may be applied to a multiprocessor data processing system.

As some illustrative examples, data processing system 300 may be a personal digital assistant (PDA), which is configured with flash memory to provide non-volatile memory for storing operating system files and/or user-generated data.

A bus system may be comprised of one or more buses, such as system bus 206, I/O bus 212 and PCI buses 216, 226 and 228 as shown in FIG. 2. Of course the buss system may be implemented using any type of communications fabric or architectures that provide a transfer of data between different components or devices attached to the fabric or architecture. A communications unit may include one or more devices used to transmit and receive data, such as modem 218 or network adapter 220 of FIG. 2 or modem 322 or LAN 312 of FIG. 3. A memory may be, for example, local memory 209 or cache such as found in memory controller/cache 208 of FIG. 2 or main memory 304 of FIG. 3. A processing unit may include one or more processors or CPUs, such as processor 202 or processor 204 of FIG. 2 or processor 302 of FIG. 3. The depicted examples in FIGS. 1-3 and above-described examples are not meant to imply architectural limitations. For example, data processing system 300 also may be a tablet computer, laptop computer, or telephone device in addition to taking the form of a PDA.

The embodiments of the present invention provide a generic symbol referencing mechanism, so that a reference to any symbol of any model can be resolved consistently. For example, the mechanism of the present invention references and resolves any symbols, including well known industry standards such as type, element, Web Service Definition Language (WSDL) 1.1 message, WSDL portType/interface, and also any user-defined symbols such as IBM® WebSphere Business Integration (WBI) relationship, WBI rules, etc. Models may be any objects. For example, type models may be EClassifier, XSDTypeDefinition, or any other user-defined objects. Element models may be EStructuralFeature, XSDElementDeclaration, or any other user-defined objects as well. The mechanism of the present invention also supports symbol loading on demand, and the scoping is not limited to class loaders.

The mechanism of the present invention supports a broader range of symbol referencing than presently available systems, such as Eclipse Modeling Framework. If Eclipse Modeling Framework incorporated the mechanism of the present invention but then functioned independently from the mechanism of the present invention, symbol referencing for symbols supported by Eclipse Modeling Framework may result in the return of two separate references. Therefore, to avoid this duplication of effort, the illustrative embodiments of present invention adapts Eclipse Modeling Framework's EPackage.Registry to "type as EClassifier" symbol and "element as EStructuralFeature" symbol respectively, so that the users of this generic symbol referencing mechanism may have a unified approach to access all symbols.

The mechanism of the present invention uses not only names and referencable symbols, as used in the Eclipse Modeling Framework described above, but also uses name spaces, name space registries, and symbol spaces. A name space in the present invention is a space for a set of names, where the names are of the same category, and each name is associated with its referencable symbol. A name space registry is a set of name spaces that share the same scope in the model. A symbol space is a set of name space registries that share the same category of definitions for referencable symbols. A symbol space registry is the set of all the symbol spaces.

An instance is an individual object of a certain class. While a class is just the definition of a category, an actual usage of a class is called an "instance." Each instance of a class can have different values for its instance variables, i.e. its state. Therefore, a name space instance is an individual object of a certain class where a set of specific names are associated with their specific referencable symbols, including specific name instances associated with their specific referencable symbol instances. A name space registry instance is a specific set of name space instances, and a symbol space instance is a set of name space registry instances.

FIG. 4 illustrates an example of how Eclipse Modeling Framework 400 fits into a generic symbol referencing mechanism 410, in accordance with an illustrative embodiment of the present invention. In the illustrative examples, the adaptation extends Eclipse Modeling Framework's classLoaderToRegistryMap to use "type as EClassifier" symbol space scoping instead of just class loader and also adapts Eclipse Modeling Framework's EPackage.Registry 402 instance to NameSpace.Registry 412 instance into "type as EClassifier" symbol space.

The adaptation also adapts EPackage to name space, EClassifier to referencable symbol in "type as EClassifier" 404 symbol space, and document root EStructuralFeature to referencable symbol in "element as EStructuralFeature" 406 symbol space.

The symbol space registry has implementation options. The symbol space registry may be a standalone singleton, the only instance of its class. Additionally, the user has the option of adding more functions to the EPackage.Registry.IN-STANCE by modifying name space with symbol space plus model. For example, the name space "http://www.ibm.com" in "element as EStructuralFeature" 406 symbol space maps to the key "element as EStructuralFeature http://www.ibm.com" in EPackage.Registry 402.

The illustrative examples of the present invention provide symbol spaces to represent the combinations of symbol space plus model. For example, Eclipse Modeling Framework supports only "type as EClassifier" and "element as EStructuralFeature," where "type" and "element" are symbols, or names, and "EClassifier" and "EStructuralFeature" are models, or referencable symbols. In contrast, the mechanism of the present invention represents "type as EClassifier" 404 and "type as XSDTypeDefinition" 414 in different symbol space instances, and also represents "element as EStructuralFeature" 406 and "element as XSDElementDeclaration" 416 in different symbol space instances. In contrast to Eclipse Modeling Framework, embodiments of the present invention do not represent "type as EClassifier" and "type as XSDTypeDefinition" as the same symbol space instance because the embodiments of the present invention support other models for type, not just "EClassifier." Similarly, in contrast to Eclipse Modeling Framework, the embodiments of the present invention do not represent "element as EStructuralFeature" and "element as XSDElementDeclaration" as the same symbol space instance because the embodiments of the present invention support other models for elements.

Representations of the present invention are begun by mapping from each symbol space plus model in a set of symbol space plus models in symbol space registry to an instance of symbol space, wherein the set of symbol space plus models contains at least one symbol space plus model. Symbol space registry is a singleton, the only instance of the class, and is referenced as SymbolSpace.REGISTRY. This invention also provides Registry.StrategyContext for users to specify their own symbol space registry implementation. Each symbol space plus model has its own symbol space in symbol space registry.

Figure 5:
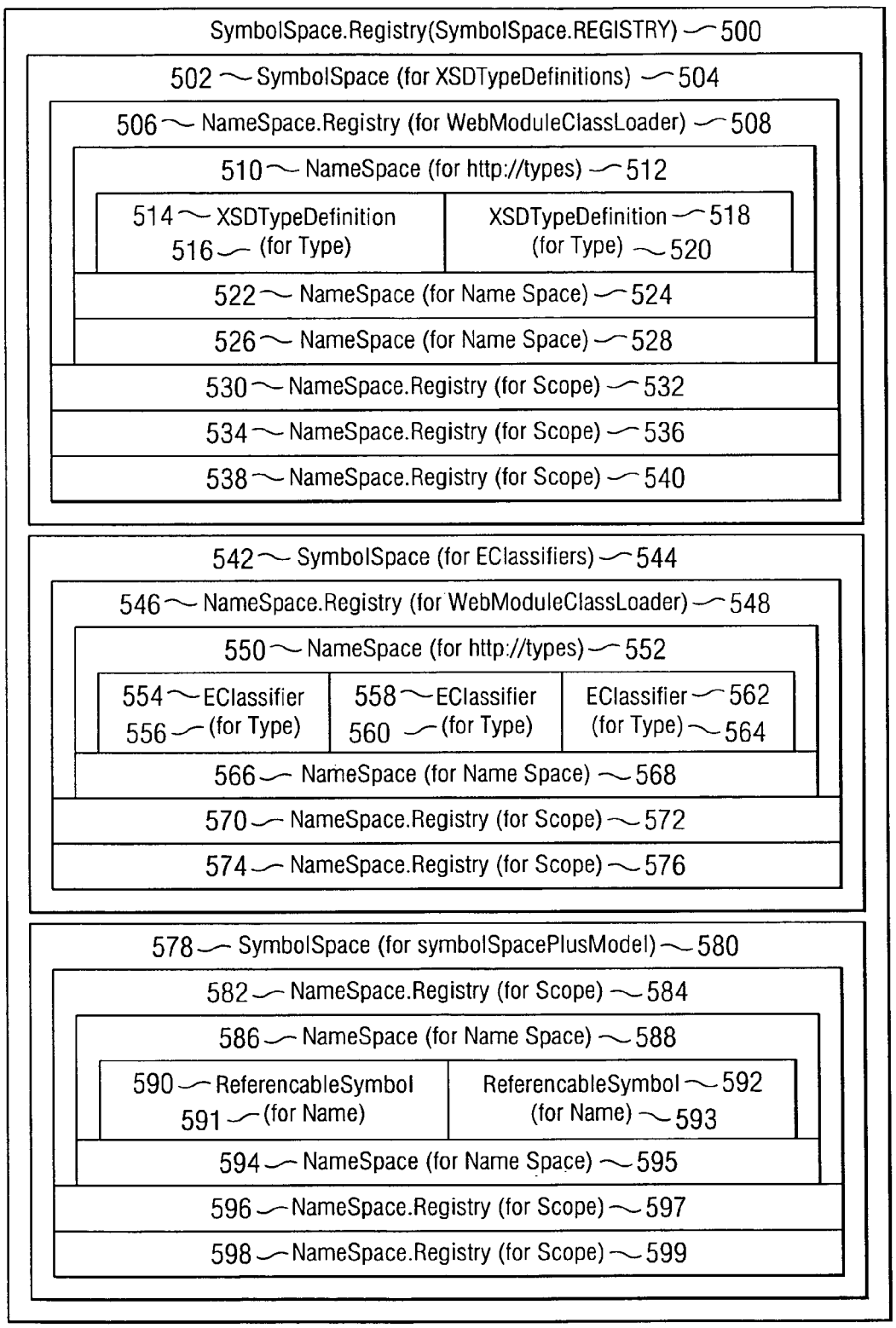
FIG. 5 illustrates an example of the present invention's representations, in accordance with an illustrative embodiment of the present invention.

FIG. 5 illustrates an example of the present invention's representations, including symbol space representations, as XSDTypeDefinitions 504 maps to SymbolSpace 502, EClassifiers 544 maps to SymbolSpace 542, and symbolSpacePlusModels 580 maps to SymbolSpace 578. NameSpace.Registry 412 in FIG. 4 may be part of the SymbolSpace.Registry 500 in FIG. 5.

Each of a set of scopes in each symbol space maps to an instance of name space registry, wherein each scope is a category specifying a domain such as local or global and the set of scopes includes at least one scope. An example of the present invention's name space registry representations is illustrated, as SymbolSpace 502 for XSDTypeDefinitions 504 maps to multiple instances of name space registry, with a different name space for each scope. WebModuleClassLoader 508 maps to NameSpace.Registry 506, Scope 532 maps to NameSpace.Registry 530, Scope 536 maps to NameSpace.Registry 534, and Scope 540 maps to NameSpace.Registry 538.

Each of a set of name spaces in each name space registry maps to an instance of name space, wherein the set of name spaces includes at least one name space. For example, NameSpace.Registry 506 for WebModuleClassLoader 508 maps NameSpace 510 for http:/types 512, NameSpace 522 for Name Space 524, and NameSpace 526 for Name Space 528.

Each of a set of names in each name space maps to an instance of referencable symbol, wherein the set of names includes at least one name. For example, NameSpace 510 for http:/types 512 maps XSDTypeDefinition 514 for Type 516 and XSDTypeDefinition 518 for Type 520. In comparison, NameSpace 550 for http:/types 552 in SymbolSpace 542 maps EClassifier 554 for Type 556, EClassifier 558 for Type 560 and EClassifier 562 for Type 564. Additionally, NameSpace 586 for Name Space 588 in SymbolSpace 578 maps ReferencableSymbol 590 for Name 591 and ReferencableSymbol 592 for Name 593.

Each symbol space provides a function named iterateNamesRegistry to iterate through each specified instance of name space registry in the symbol space, with the iteration executed according to the scope for each name space registry. This enables the user to specify to iterate through a name space registry according to the scope of the name space registry in order to get a referencable symbol for a specified name in a specified name space. FIG. 6 illustrates a names registry iteration algorithm that may be used by a mechanism of the present invention.

A user specifies the scope, the name space and the name. The names registry iteration algorithm iterates through the name space registry with the matching scope in a symbol space. While iterating through a name space registry, the names registry iteration algorithm begins to iterate through name spaces. If the iteration to a name space results in a match, then the names registry iteration algorithm begins to iterate through the names in name space for a match to the name specified by the user. If this iteration results in a match, the names registry iteration algorithm returns the referencable symbol associated with specified name.

For example, if a user specifies the scope as WebModuleClassLoader 508, the name space as http://types 512 and the name as Type 520, the names registry iteration algorithm iterates through NameSpace.Registry 506 in SymbolSpace 502, which has the scope matching WebModuleClassLoader 508. Even if the referencable symbol for the specified name in the specified name space is not found, the names registry iteration algorithm does not iterate through NameSpace.Registry 530, NameSpace.Registry 534, and NameSpace.Registry 538 in SymbolSpace 502 because these name space registries do not have a scope that matches the specified scope.

While iterating through NameSpace.Registry 506, the names registry iteration algorithm begins to iterate through NameSpace 510 for http://types 512, NameSpace 522 for Name Space 524, and NameSpace 526 for Name Space 528. Because the user has specified name space as http://types 512, the iteration to NameSpace 510 for http://types 512 results in a match.

Then the names registry iteration algorithm begins to iterate through the names in NameSpace 510 for a match to the name specified by the user, including XSDTypeDefinition 514 for Type 516 and XSDTypeDefinition 518 for Type 520. Because the user has specified name as Type 520, the iteration to XSDTypeDefinition 518 for Type 520 results in a match.

Then the iterateNamesRegistry algorithm returns XSDTypeDefinition 518 as the result of the iteration specified by the user. In this example, the iterateNamesRegistry algorithm gets an XSDTypeDefinition for a type. Although Eclipse Modeling Framework supports the symbol space of type, Eclipse Modeling Framework does not support type models such as XSDTypeDefinitions.

Comparison to another example further illustrates the function of the iterateNamesRegistry algorithm. In this example, if a user specifies the scope as WebModuleClassLoader 548, the name as Type 556 and the name space as http://types 552, the names registry iteration algorithm iterates through NameSpace.Registry 546 in SymbolSpace 542, which has the scope matching WebModuleClassLoader 548. Even if the referencable symbol for the specified name in the specified name space is not found, the iterateNamesRegistry algorithm does not iterate through NameSpace.Registry 570 and NameSpace.Registry 574 in SymbolSpace 542 because these NameSpace.Registrys do not have a scope that matches the specified scope.

While iterating through NameSpace.Registry 546, the names registry iteration algorithm begins to iterate through NameSpace 550 for http://types 552 and NameSpace 566 for Name Space 568. Because the user has specified name space as http://types 552, the iteration to NameSpace 550 for http://types 552 results in a match.

Then the names registry iteration algorithm begins to iterate through the names in NameSpace 550 for a match to the name specified by the user, including EClassifier 554 for Type 556, EClassifier 558 for Type 560, and EClassifier 562 for Type 564. Because the user has specified name as Type 556, the iteration to EClassifier 554 for Type 556 results in a match.

Then the iterateNamesRegistry algorithm returns EClassifier 554 as the result of the iteration specified by the user. In this example, the names registry iteration algorithm gets an EClassifier from a symbol space for a type.

Each symbol space can have its own scoping, a series of related scopes for each names space registry, and the default is the scoping from symbol space registry. The scope of a name space is the region of a program source within which the name space represents a certain thing. A name space with a specified scope may also have a parent scope, a greater scope which includes the specified scope within which the name space represents a certain thing. Likewise, this parent scope may have a parent scope of its own, such that the original specified scope also has the parent scope of its parent scope as its grandparent scope. If a name space is not identified within its specified scope, the parent scope may be checked by a scoping algorithm for the name space that was not identified. Symbol space registry has provided a scoping based on a class loader, illustrated in a scoping algorithm of FIG. 7 that may be used by a mechanism of the present invention. Multiple levels of scoping may exist for a name. If an iteration algorithm is iterating for a specified name and does not find the name using the specified scope, then the scoping algorithm uses the parent scope of the specified scope, provided that the specified scope has a parent scope. If the iteration algorithm continues iterating for the specified name and still does not find the name using the parent scope of the specified scope, then the scoping algorithm uses the parent scope for the parent scope, or the grandparent scope for the specified scope, provided that the specified scope has a grandparent scope.

FIG. 8 illustrates applications for a scoping algorithm that may be used by a mechanism of the present invention. In one example, three levels of scoping exist for a name, WebModuleClassLoader 802, ApplicationClassLoader 804, and ServerClassLoader 806. If an iteration algorithm is iterating for a specified name and does not find the name using the scope of WebModuleClassLoader 802, then the scoping algorithm uses the scope ApplicationClassLoader 804 because ApplicationClassLoader 804 is the parent scope for WebModuleClassLoader 802. If the iteration algorithm continues iterating for the specified name and does not find the name using the scope of ApplicationClassLoader 804, then the scoping algorithm uses the scope ServerClassLoader 806 because ServerClassLoader 806 is the parent scope for ApplicationClassLoader 804 and the grandparent scope for WebModuleClassLoader 802.

Alternatively, in another example, two levels of scoping exist for a name, ServerClassLoader 808 and ApplicationClassLoader 810. If an iteration algorithm is iterating for a specified name and does not find the name using the scope of ServerClassLoader 808, then the scoping algorithm uses the scope ApplicationClassLoader 810 because ApplicationClassLoader 810 is the parent scope for ServerClassLoader 808.

Symbol space provides two kinds of most frequently used names registry iteration algorithms, illustrated in the names registry iteration algorithms of FIG. 9. The first names registry iteration algorithm may be used when the user supplies the names registry iteration algorithm with a specified name and a specified name space, for which the names registry iteration algorithm returns a referencable symbol. For example, in FIG. 5, as described above, the user specifies name space as http://types 512 and name as Type 520, and the names registry iteration algorithm returns XSDTypeDefinition 518 as the result of the iteration specified by the user.

The second names registry iteration algorithm is used when the user specifies only the name space. If a user specifies only a name space, the second names registry iteration algorithm returns the name space that matches the specified name space, whereby the name space contains all instances, such that the user can select from a set of the referencable symbols contained therein, wherein the set contains at least one referencable symbol.

Based on a variation of the example in FIG. 5 described above, the user specifies only a name space, such as http://types 512. With only a name space input specified, the second iteration algorithm returns the name space that matches the specified name space, whereby the name space contains all instances, such that the user can select from a set of the referencable symbols contained therein, which includes XSDTypeDefinition 514 and XSDTypeDefinition 518.

Not only does name space registry map from name space to name space, if a specified name space is not found in the specified name space registry, the name space registry calls "Loader#load(NameSpace.Registry, Object nameSpace)" first in loaders( ), and then in the corresponding symbol space loaders( ), until a file containing the name space is loaded on demand from an external source. This option of loading on demand from an external source is not available for Eclipse Modeling Framework. Additionally, when multiple files are loaded and more than one file has the same name space, then the loader may, based on a user-selectable option, aggregate the files into one unified name space, called a federated name space. For example, if a loader loads an XSD file and a WSDL file, and both have a name space for http://types, the loader may create one resulting name space for http://types that has the aggregated content from both the XSD file and the WSDL file.

Depending on what is found through iteration, name space registry provides "Object get (Object space, Object name)" to use different approaches to resolve a specified symbol (name or name space) not found in the specified name space registry by loading a file containing the specified symbol. For example, if after iterating for a specified name the name space is found corresponding to the specified name space, but the specified name is not found, then the specified name space registry calls "Loader#load(NameSpace.Registry, NameSpace space, Object name)" first in loaders( ), then in the corresponding symbol space loaders( ), until a file containing the specified name is loaded on demand from an external source.

However, if after iterating for a symbol neither the specified name nor the specified name space are found, then the specified name space registry calls "Loader#load (NameSpace.Registry, Object space, Object name)" first in loaders( ), then in the corresponding SymbolSpace loaders( ), until the file containing the specified symbol is loaded on demand from an external source. In contrast to the first example of loading a file from an external source, in which the newly loaded name is registered in the specified name space that was found, in the second example a new name space is created based upon the newly loaded name space containing the newly loaded name. With loading on demand, the mechanism of the present invention has no constraints on name space, name or symbol at all, as they are all treated as objects. Because of this lack of constraint, the symbol referencing mechanism cannot be more generic.

The mechanism of the present invention provides two additional capabilities, whereby referencable symbol automates symbol registering, and symbol reference simplifies symbol resolving. These capabilities enable a user to modify existing symbols and to follow a symbol reference that is registered as a referencable symbol.

The referencable symbol capability enables the automatic registering into name space within the corresponding name space registry and symbol space for any symbol modified by the user. Symbols have properties that specify their symbol space, name space, and name. If a user modifies the "space" property for a symbol, then the symbol is automatically registered into the designated symbol space. The "name" property includes two elements, a "namespaceURI" element and a "localpart" element. If a user modifies the "namespaceURI" element of the "name" property for a symbol, then the symbol is automatically registered into the designated name space of the same scope. If a user modifies the "localPart" element of the "name" property for a symbol, then the symbol is automatically registered into the designated name in the name space.

In some instances, iterating for a symbol will not result in the iterating algorithm returning a referencable symbol, but in the iterating algorithm returning a symbol reference, a reference to another symbol. The symbol reference capability enables any iteration for a symbol that returns a symbol reference to automatically register into the name space within the corresponding name space registry and the corresponding "Symbol Reference" symbol space. Therefore, the symbol reference itself is also referencable automatically. The "name" property is optional for such a symbol reference, as the default value is the "reference" property of the symbol reference, the additional property that specifies a subsequent symbol's name space and name.

Symbol reference simplifies symbol resolving by providing an alternative resolving beyond the iterating process described above. A simple call to "resolve (intfollowSymbolReferences)" eventually obtains the symbol specified by the "space" property and the "reference" property, with the number of recursions depending on how many times the recursive call has to follow yet another symbol reference. Such a call even executes the XPath specified by the optional "path" property so that the specified object inside the symbol will be returned. Because the resolved symbol can be another symbol reference, this symbol reference capability has the option to specify how deep to follow the symbol references. The user can specify "-1" to follow all symbol references along the way until either a non-symbol reference is reached or until the symbol reference is referenced by itself. Alternatively, the user can specify that the symbol reference returns the first symbol reference found.

FIG. 10 illustrates a flowchart of a process for resolving references to symbols in accordance with an illustrative embodiment of the present invention. A user specifies a scope, a name space and a name (step 1000). The names registry iteration algorithm iterates through the name space registry with the matching scope in a symbol space (step 1002). While iterating through a name space registry, the names registry iteration algorithm begins to iterate through name spaces (step 1004). If the iteration to a name space results in a match, then the names registry iteration algorithm begins to iterate through the names in the matching name space for a match to the name specified by the user (step 1006). If this iteration results in a match (step 1008), the names registry iteration algorithm returns the referencable symbol associated with matching name (step 1010), with the process terminating thereafter.

Turning back to step 1008, if the names registry iteration algorithm does not find the specified name using the current scope, then the scoping algorithm checks for a parent scope of the current scope (step 1012). If the current scope has a parent scope, then the scoping algorithm checks the parent scope for the current scope (step 1014). Then the process returns to step 1002.

Turning back to step 1012, if after iterating through all potential parent scopes for a specified name and either the specified name or the specified name space are still not found, then the specified name space registry calls loaders, until the file containing the specified symbol is loaded on demand from an external source (step 1016).

Altogether, the flowchart for mechanism as shown in FIG. 10 and described above provides an improved method for a generic symbol referencing mechanism.

The invention can take the form of an entirely hardware embodiment, an entirely software embodiment or an embodiment containing both hardware and software elements. In an illustrative embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

The description of the embodiments of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for resolving references to symbols, the method comprising:
 receiving a reference to a symbol for resolution; and
 responsive to receiving the reference, identifying the symbol using a data structure, wherein the data structure comprises a set of symbol space instances, wherein a symbol space instance in the set of symbol space instances comprises a set of name space registry instances, wherein a name space registry instance in the set of space name registry instances comprises a set of name space instances, wherein a name space instance in the set of space name instances comprises a set of name instances, wherein a name instance in the set of name instances corresponds to a referencable symbol instance, and wherein the referencable symbol instance corresponds to the symbol;
 wherein the identifying step comprises:
 identifying the symbol space instance from the set of symbol space instances using a symbol space that corresponds to a model;
 identifying the name space registry instance from the set of name space registry instances within the identified symbol space instance using a scope;
 identifying the name space instance from the set of name space instances within the identified name space registry instance using a name space;
 identifying the name instance from the set of name instances within the identified name space instance using a name; and
 identifying the referencable symbol instance that corresponds to the identified name instance to resolve the symbol.

2. The method of claim 1, wherein the model, the scope, the name space and the name originates from a user input.

3. The method of claim 1, wherein the scope is a default scope that corresponds to a scope of the symbol space.

4. The method of claim 1, further comprising:
 converting the symbol into a computer usable code.

5. The method of claim 4, wherein the computer usable code is executable code.

6. The method of claim 1, further comprising:
 responsive to an inability to identify a name instance, identifying a parent name space registry instance from the set of name space registry instances using a parent scope of the identified name space registry instance;
 identifying the name space instance from the set of name space instances within the identified parent name space registry instance using a name space;
 identifying the name instance from the set of name instances within the identified name space instance using a name; and
 identifying the referencable symbol instance that corresponds to the identified name instance to form the symbol.

7. The method of claim 1 further comprising:
 responsive to identifying the name space instance from the set of name space instances within the identified name space registry instance using a name space and not specifying a name; and
 identifying a set of referencable symbol instances within the identified name space registry instance; and
 identifying a referencable symbol instance from the set of referencable symbol instances to resolve the symbol.

8. The method of claim 1, further comprising:
 responsive to an inability to identify the name space instance from the set of name space instances within the identified name space registry instance using a name space, loading a file containing the name space instance from an external source.

9. The method of claim 8, further comprising:
 responsive to loading a plurality of files from an external source, wherein the plurality of files contain a same name space instance, aggregating the plurality of same name space instances from the plurality of files into one name space instance.

10. The method of claim 1, further comprising:
 responsive to an inability to identify the name instance from the set of name instances within the identified name space instance using a name, loading a file containing the name instance from an external source.

11. the method of claim 1, further comprising:
 registering a symbol modified by a user into the name space instance within the name space registry instance and within the symbol space instance for the symbol.

12. The method of claim 1, further comprising:
 responsive to identifying a symbol reference instance that corresponds to the identified name instance to resolve the symbol, following the symbol reference to get the referencable symbol.

13. The method of claim 1, further comprising:
 adapting an Eclipse Modeling Framework EPackage.Registry to eliminate identifying more than one referencable symbol instance when resolving references to symbols supported by Eclipse Modeling Framework.

14. The method of claim 1, wherein the data structure is one of a singleton and an instance of Eclipse Modeling Framework EPackage.Registry modified to include additional functions.

15. A data processing system for resolving references to symbols, comprising:
 a bus,
 a memory connected to the bus, wherein the memory contains computer usable code;
 a communications unit connected to the bus; and
 a processing unit connected to the bus, wherein the processing unit executes the computer usable code to receive a reference to a symbol for resolution; and to identify the symbol using a data structure, wherein the data structure comprises a set of symbol space instances, wherein a symbol space instance in the set of symbol space instances comprises a set of name space registry instances, wherein a name space registry instance in the set of space name registry instances comprises a set of name space instances, wherein a name space instance in the set of space name instances comprises a set of name instances, wherein a name instance in the set of name instances corresponds to a referencable symbol instance, and wherein the referencable symbol instance corresponds to the symbol, responsive to receiving the reference;

wherein the processing unit further executes the computer usable code to identify the symbol space instance from the set of symbol space instances using a symbol space that corresponds to a model, identify the name space registry instance from the set of name space registry instances within the identified symbol space instance using a scope, identify the name space instance from the set of name space instances within the identified name space registry instance using a name space, identify the name instance from the set of name instances within the identified name space instance using a name, and identify the referencable symbol instance that corresponds to the identified name instance to resolve the symbol.

16. The data processing system of claim 15, wherein the processing unit further executes the computer usable code to identify a parent name space registry instance from the set of name space registry instances using a parent scope of the identified name space registry instance in response to an inability to identify a name instance, identify the name space instance from the set of name space instances within the identified parent name space registry instance using a name space, identify the name instance from the set of name instances within the identified name space instance using a name, and identify the referencable symbol instance that corresponds to the identified name instance to form the symbol.

17. A computer program product stored on a recordable-type computer useable medium for resolving references to symbols, the computer program product comprising:

computer usable program code configured to receive a reference to a symbol for resolution; and computer usable program code configured to identify the symbol using a data structure, wherein the data structure comprises a set of symbol space instances, wherein a symbol space instance in the set of symbol space instances comprises a set of name space registry instances, wherein a name space registry instance in the set of space name registry instances comprises a set of name space instances, wherein a name space instance in the set of space name instances comprises a set of name instances, wherein a name instance in the set of name instances corresponds to a referencable symbol instance, and wherein the referencable symbol instance corresponds to the symbol, responsive to receiving the reference;

wherein the computer usable program code configured to identify the symbol using a data structure comprises:

computer usable program code configured to identify the symbol space instance from the set of symbol space instances using a symbol space that corresponds to a model;

computer usable program code configured to identify the name space registry instance from the set of name space registry instances within the identified symbol space instance using a scope;

computer usable program code configured to identify the name space instance from the set of name space instances within the identified name space registry instance using a name space;

computer usable program code configured to identify the name instance from the set of name instances within the identified name space instance using a name; and computer usable program code configured to identify the referencable symbol instance that corresponds to the identified name instance to resolve the symbol.

* * * * *